United States Patent
Gros et al.

[11] Patent Number: 5,328,326
[45] Date of Patent: Jul. 12, 1994

[54] IMPULSE TURBINE WITH A DRUM ROTOR, AND IMPROVEMENTS TO SUCH TURBINES

[75] Inventors: Jean-Pierre Gros, Villemomble; Guillaume Verschaeve, St. Jean de Braye, both of France

[73] Assignee: GEC Alsthom SA, Paris, France

[21] Appl. No.: 870,683

[22] Filed: Apr. 17, 1992

[30] Foreign Application Priority Data

Apr. 19, 1991 [FR] France .................. 91 04855

[51] Int. Cl.⁵ .............................................. F01D 1/10
[52] U.S. Cl. .................................. 415/115; 415/173.7
[58] Field of Search ................ 415/115, 173.1, 173.5, 415/173.7, 174.5

[56] References Cited

U.S. PATENT DOCUMENTS 2,197,521  4/1940  Egli .
2,619,318 11/1952  Schaer ........................ 416/200 A
5,232,338  8/1993  de Paul et al. ................. 415/115

FOREIGN PATENT DOCUMENTS

2149619  3/1973  France .

Primary Examiner—Edward K. Look
Assistant Examiner—Michael S. Lee
Attorney, Agent, or Firm—Sughrue, Mion, Zinn, Macpeak & Seas

[57] ABSTRACT

An impulse steam turbine has a rotor and a stator and a plurality of stages each constituted by a diaphragm with stationary blading followed by moving blading comprising blades that rotate with the rotor. The moving blades are mounted directly on the rotor, and not on disks, with the stationary blading providing more than 85% of the pressure drop at the base of each stage. Such turbines may be provided with improvements that reduce secondary losses. Efficiency is improved by several percentage points.

4 Claims, 8 Drawing Sheets

FIG.1

PRIOR ART

IMPULSE TURBINE WITH A DRUM ROTOR, AND IMPROVEMENTS TO SUCH TURBINES

The present invention relates to an impulse steam turbine comprising a rotor and a stator, having a plurality of stages each constituted by stationary blading followed by moving blading that rotates with the rotor, said stationary blading providing more the 85% of the pressure drop in each stage.

BACKGROUND OF THE INVENTION

In conventional impulse turbines the moving blades are molted on disks that are seared to the rotor.

For reasons relating to the dynamic behavior of the rotor (see FIG. 1), it is essential to give the rotor sufficient stiffness, thus retiring a hub of adequate diameter DR. In contrast, for reasons of efficiency, it is necessary to keep this diameter as small as possible: reducing the diameter serves to reduce the leakage section between the stationary and moving portions, thereby reducing leakage itself. These two rules enable the rotor diameter DR to be determined as a compromise.

In order to be able to fix the moving blades on a rotor disk without the disk loosing its mechanical qualities, it is necessary to leave sufficient space between the base of a blade and the shaft of the rotor. Under such conditions, when the diameter DR is fixed, there exists a bottom limit on the blade base diameter DB.

In addition, to improve efficiency (see FIG. 2) it is advantageous to increase the slenderness ratio Z (the ratio between the tip diameter of the blade $D_S$ to the base diameter of the blade DB). The greater Z (for given blade width), the lower the losses due to secondary flows (e). However, once the operating conditions of the machine have been fixed, the steam flow section is determined. This section is proportional to $DB^2(Z^2-1)$. It is therefore clear that to improve efficiency, DB should be reduced as much as possible, down to its lower limit.

In addition, it is necessary to reduce as much as possible all leakage between the stationary portions and the moving portions (f, f') in order to increase efficiency.

In particular, steam leakage (f') passing beneath the stationary blading gives rise to a large efficiency penalty: not only does this steam provide no useful work, but because of the presence of disks downstream from the stationary blading, it also penetrates radially into the main flow and degrades it.

Finally, in some cases, the relatively low pressure forces (p) on the rotor and on the moving blading may give rise to a balancing piston of diameter slightly greater than DR being provided at the head of the machine, thereby also contributing to a small drop in efficiency.

There also exist "reaction" steam turbines in which the pressure drop across a stage is split into two substantially equal portions between the stationary blading and the moving blading of the stage.

The moving blades are fixed directly on the rotor shaft. The base diameter of the blades DB is close to the shaft diameter DR (drum rotor).

Because of the pressure drop across the moving blading, the thrust on said blading is very high and necessarily gives rise to a balancing piston of large diameter being provided at the head of the machine to balance said thrust, with the diameter of the piston possibly being as great at DS (moving blade tip diameter). This contributes greatly to reducing efficiency.

It can thus be seen that thrust problems penalize the efficiency of reaction turbines greatly because of the leakage due to the large diameter of the balancing piston.

It is not possible in reaction turbines to reduce leakage by reducing the base diameter DB.

Such an operation would lead to an increase in the number of stages that would be unacceptable from the point of view of cost and from the point of view of the longitudinal size of the module under consideration, particularly if it is a high-pressure module.

Finally, it should be observed that in reaction machines, i.e. drum rotor machines, the leakage passing beneath the stationary blades does not have the same disturbing effect as it has in impulse machines with disks.

SUMMARY OF THE INVENTION

The invention makes it possible to reduce the base diameter DB in an impulse turbine and consists in no longer making use of disks for fixing the moving blades but instead in fixing them directly to the rotor itself as in a reaction turbine.

In an impulse turbine of the invention the moving blades are mounted directly on the rotor, thereby making it possible to obtain a very small difference between the base diameter DB and the shaft diameter DR.

In a turbine of the invention, very good lengthening of the steam streamlines is obtained in the expansion zones, thereby improving their aerodynamic efficiency.

This is advantageous for all of the streamlines of an impulse turbine having a low mass-to-volume ratio at the head of the machine, and in particular for the high pressure streamlines of subcritical turbines of low mass flow rate, and for the high pressure streamlines of supercritical turbines, whatever the mass flow rate.

In the turbine of the invention, when the base diameter DB is reduced, it is necessary to increase the number of stages.

However, it should be observed that the increase in the number of stages is not accompanied by an increase in streamline length.

This is due to the following factors:

the same width is conserved for the moving blades (at equivalent stress level);

diaphragm thicknesses are reduced due to the reduction in Δp and the area over which forces are applied;

rotor disks are omitted and the extra axial length due to the drilling in said disks for fixing the moving blades is eliminated; and the clearance required between the disks and the diaphragms is eliminated.

In addition, there appears a reduction in the transverse size of the module overall due to the reduction in the streamline base diameter.

The advantage of this reduction is greatest in the high pressure module, thereby making it easier to obtain the required mechanical strength in the stator portions.

BRIEF DESCRIPTION OF THE DRAWINGS

Embodiments of the invention are described by way of example with reference to the accompanying drawings, in which.

DETAILED DESCRIPTION

Figure 1:
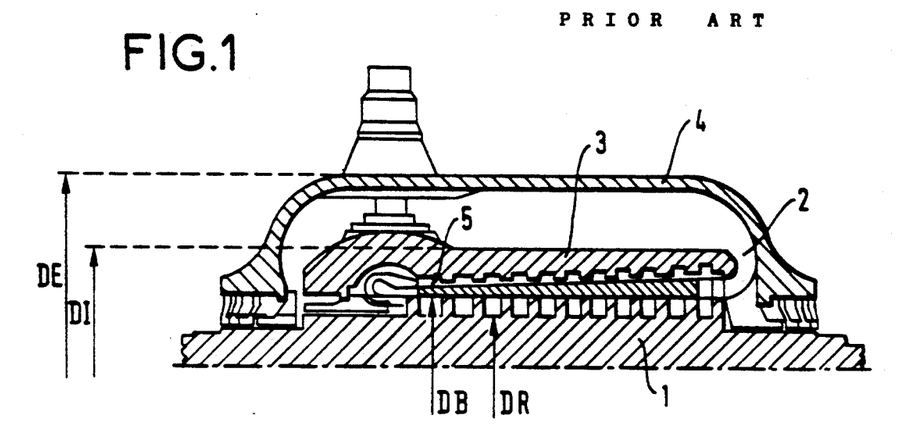
FIG. 1 is a section through a conventional impulse turbine having a drum rotor.
Figure 2:
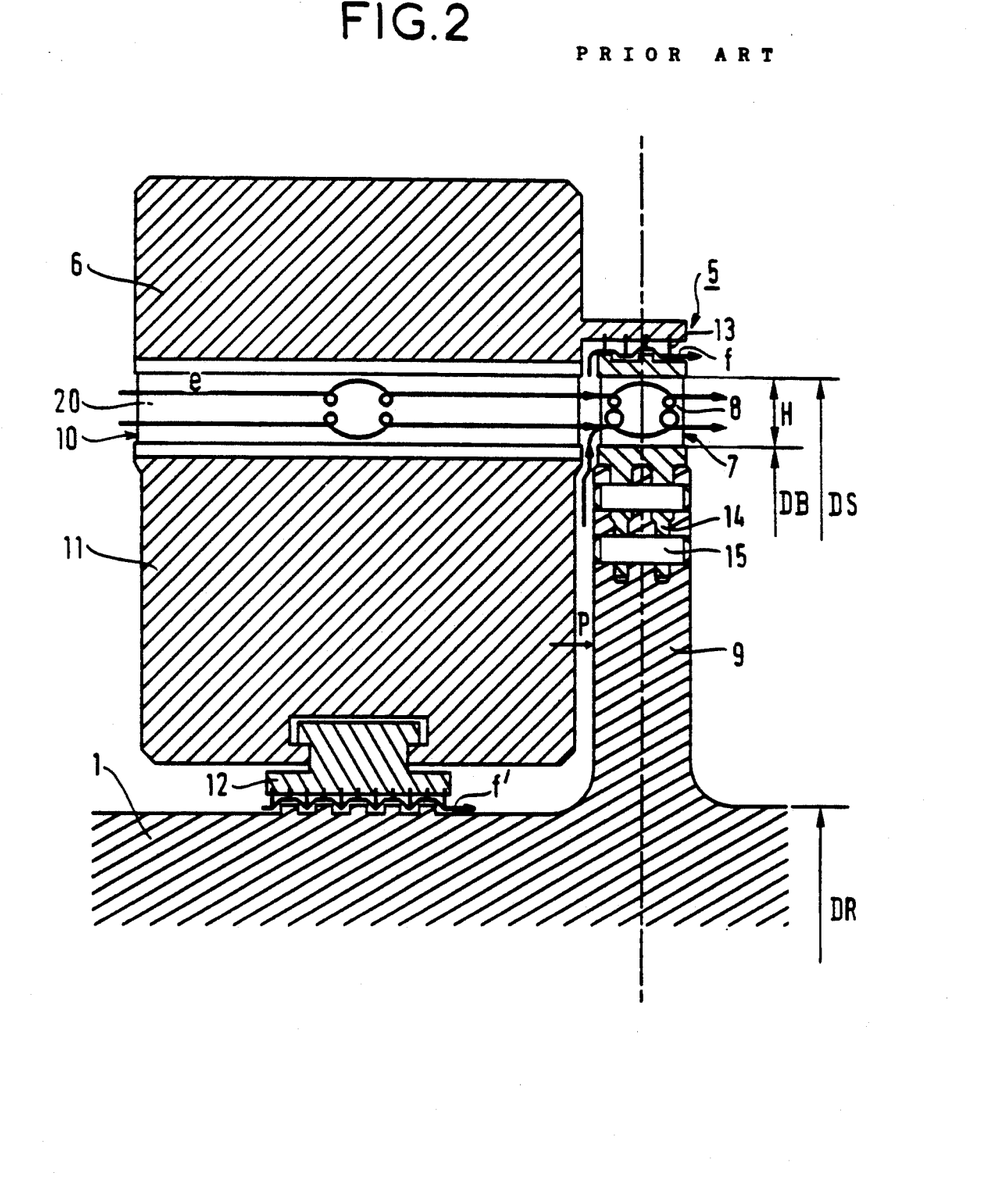
FIG. 2 shows one stage of the FIG. 1 turbine.

The conventional impulse turbine shown in FIGS. 1 and 2 includes a rotor 1 and a stator 2 comprising an inner stator 3 and an outer stator 4, there being a plurality of stages 5. Each stage 5 is constituted by a diaphragm 6 secured to the inner stator 3 followed by moving blading 7.

The moving blading 7 comprise individual moving blades 8 fixed on a disk 9 secured to the rotor 1.

The diaphragm 6 includes stationary blading 10 constituted by individual stationary blades 20 disposed facing the moving blades 8. The blades 20 support a ring 11 having a gland 12 mounted thereon to provide sealing with the rotor shaft 1.

In addition, a gland 13 is mounted at the tips of the moving blades 8 to provide rotor/stator sealing. This gland also provides thermal protection for the stator.

The roots of the moving blades 8 are provided with fingers 14 that are fixed in the disk 9 by pins 15.

The diameter DR of the rotor shaft 1 is fixed by a compromise between rotor stiffness which requires the diameter to be sufficiently large and reducing leakage which is obtained by reducing the diameter as much as possible.

To fix the blades 8 on the disk 9 without the disk loosing its mechanical qualities, it is necessary to leave enough space between the rotor shaft 1 and the roots of the blades 8. Under such conditions, once DR has been fixed, the lower limit for DB (the base diameter of the blades) is also fixed.

In an impulse turbine, the stationary blading 10 provides 85% to 95% of the pressure drop at the base of a stage, with the remainder being provided by the moving blading 7.

Figure 3:
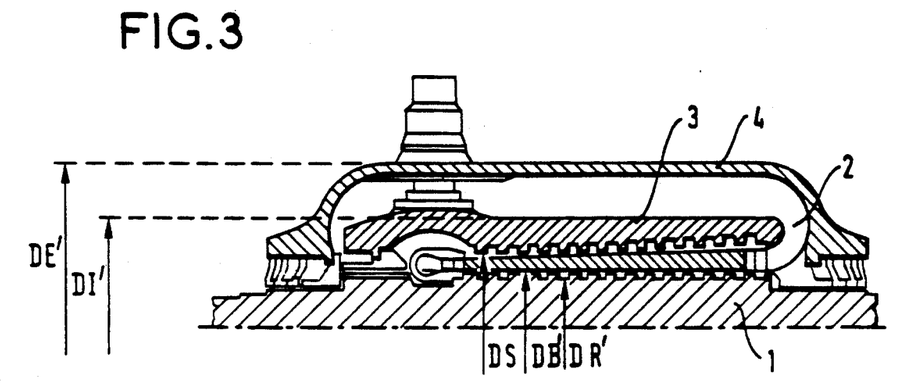
FIG. 3 is a section through an impulse turbine of the invention having a drum rotor.
Figures 4, 5, 6:
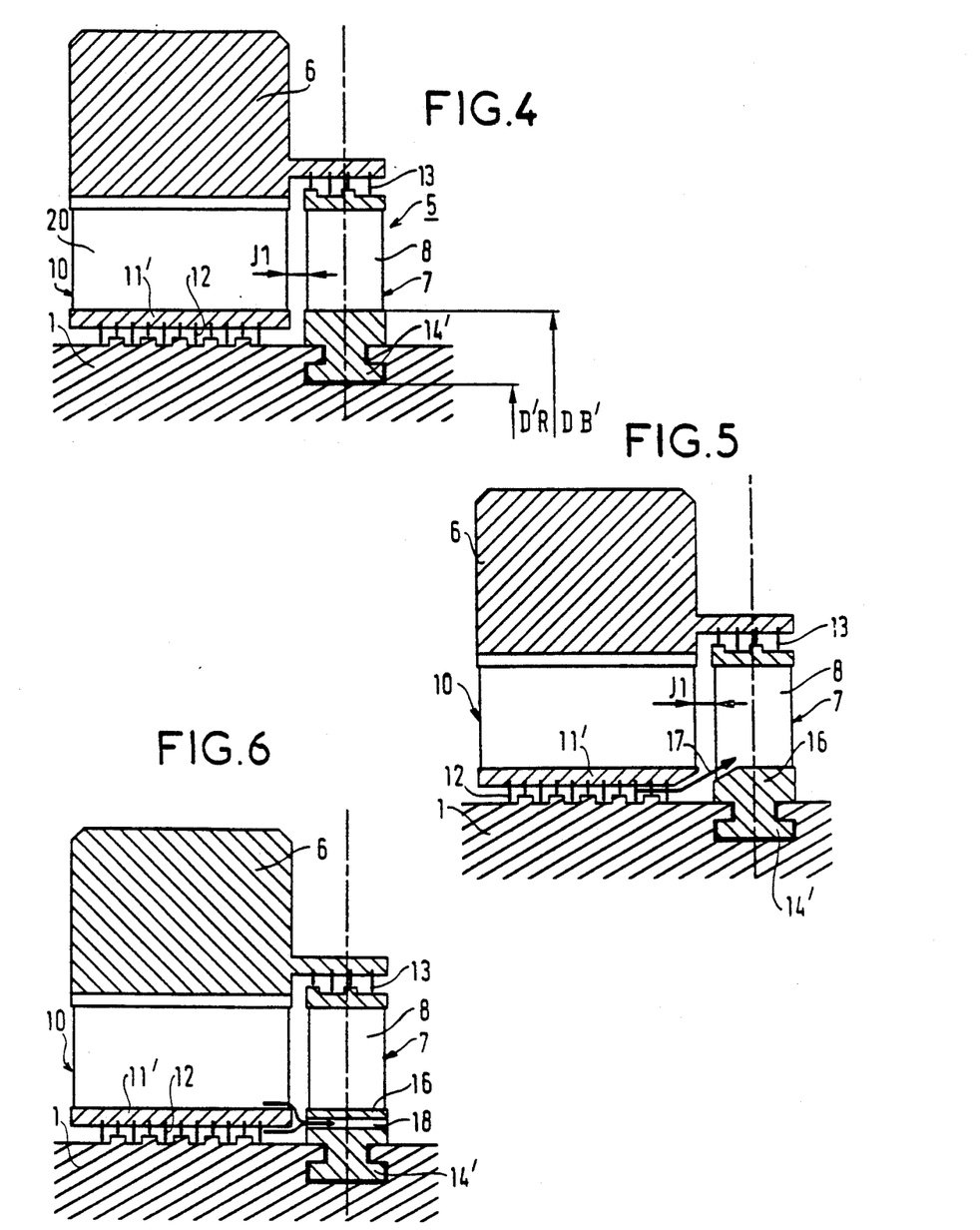
FIG. 4 shows one stage of the FIG. 3 turbine.
FIG. 5 is a section through one stage of an impulse turbine of the invention provided with a first improvement.
FIG. 6 is a section through one stage of an impulse turbine of the invention provided with a second improvement.

The impulse turbine of the invention is shown in FIGS. 3 and 4. Corresponding items are given the same references as in FIGS. 1 and 2.

This turbine thus includes stationary blading 10 followed by moving blading 7, with the stationary blading 10 providing 85% to 95% of the pressure drop at the base of the stage, while the remainder of the pressure drop is provided by the moving blading 7.

Instead of being fixed to a disk, each moving blade 8 is fixed directly to the rotor 1 (a drum rotor). As a result, DB' (the base diameter of the blades 8) is very close to DR' (the shaft diameter of the rotor), and since DB' is smaller than DB the height H of the steam flow passage increases and the efficiency of the impulse turbine is improved.

In spite of the increase in the height of the stationary blading (10), the area of the diaphragm subjected to the application of the pressure force is considerably less than that in a conventional turbine (inner ring 11' is reduced to a mere hoop or spacer band and the diameter of the outer ring is considerably smaller ).

In addition, the pressure drop Δp across an entire diaphragm is reduced since this technique has more stages.

It is therefore possible to reduce diaphragm thickness relative to a conventional diaphragm.

There is no longer any need to provide additional axial length between disks as is required in a conventional turbine to leave room for the disks to be drilled. Similarly, there is no longer any need to provide spacing between a diaphragm and a disk as used to be required to leave room for diaphragm deflection. The clearance gap J1 can therefore be small.

As can be seen by comparing FIGS. 1 and 3, the shaft diameters DR' and DR of the rotors are substantially equal.

In contrast, DB' is less than DB. The number of stages in a turbine of the invention is increased by the ratio $(DB)^2/(DB')^2$, but this increase in the number of stages does not give rise to an increase to the length of the turbine for the reasons mentioned above, so the total length of each module remains the same.

Given that the base diameter DB' is less than DB, the diameters of the inner stator DI' and of the outer stator DE' are smaller than the corresponding diameters DI and DE of a conventional impulse turbine.

The turbine of the invention thus presents a major structural advantage relative to a conventional turbine.

The increase in efficiency using a turbine of the invention may be as much as 5% for supercritical HP modules of a turbine and 3.5% for subcritical HP modules.

In an improvement of the invention shown in FIG. 5, the heels 16 of the moving blades 8 (i.e. the portions of the roots 14' thereof that project outside the rotor 1) and the facing ends of the inner hoop or spacer band 11' of the diaphragm 6 are chamfered so that the leakage passing through the gland 12 is injected substantially axially into the main flow. Under such conditions, the leakage gives rise to less disturbance in the main flow, thereby providing an additional increase in efficiency.

It should be observed that having a chamfer 17 does not increase the gap, which gap is therefore equal to the gap J1 of the FIG. 4 turbine.

In another improvement of the invention shown in FIG. 6, a hole 18 is drilled through the heel 16 of each moving blade 8 parallel to the axis of the rotor 1.

The flow section of the hole 18 is large enough to enable the entire flow rate of the leakage beneath the diaphragm 6 to pass therethrough together with a small fraction of the main flow, thereby eliminating the disturbance of secondary flows and the losses that are related thereto.

There is no difficulty in drilling the holes 18 in the heels 16 of the blades 8. In addition, it is possible to adopt the optimum hole diameter for each set of moving blading 7. In contrast, in impulse turbines having disks (FIG. 7) drilling the disks is difficult and not always possible, given the diameter of the shaft or the depth of the fingers. In addition, these holes are drilled using a single drill bit which implies that they all have the same diameter, thereby making it impossible to optimize dimensions.

Figure 7:
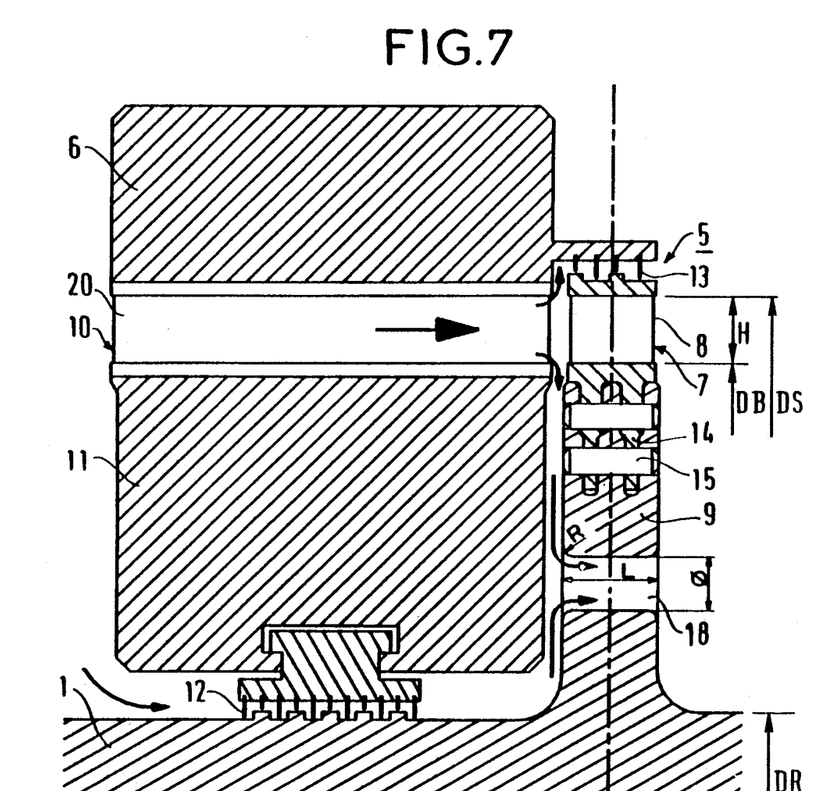
FIG. 7 is a section through a conventional impulse stage provided with the same improvement as FIG. 6.

In addition, given the way in which they are constructed, the size of the holes 18 prevents them from having an optimum inlet rounding (ratio $R/\phi$ where $R$ = convection radius between the hole and the face of the disk and $\phi$ = hole diameter) nor an optimum ratio $L/\phi$ (where $L$ = hole length).

To ensure that the flow rate coefficient of the hole is substantially independent of the angle of incidence of the fluid, it is necessary for the ratio $R/\phi$ to be greater than 0.5 and for the ratio $L/\phi$ to be greater than 2.

Having such holes 18 present modifies the ventilation flows and thus the pressure distribution over the disk. The pressure difference between the upstream end and the downstream end of a hole is not known accurately (even if the pressure difference between the upstream and the downstream sides of the blades is accurately determined at the base of the blade). This uncertainty has an effect both on the flow rate passing through the hole and on the thrust exerted on the disk.

Under such conditions, it is very difficult to provide optimum dimensions for the equilibrium holes 18. In practice, this means that the gain in efficiency that is achieved is much less than the maximum gain that is theoretically possible.

However, moving blading of the invention can achieve the following advantages:
  optimum inlet rounding ($R/\phi$ about 1);
  incidence of the steam at the inlet is known, and in addition has little effect on the rate at which steam flows through the hole;
  the pressure difference between the upstream end and the downstream end of the hole is completely determined (being fixed by the degree of reaction at the base of the blade);
  the ratio $L/\phi$ is optimum; and
  under such conditions, the dimensioning of the equilibrium holes presents no difficulty and their efficiency is close to the theoretical maximum.

In addition, uncertainty on end thrust is not increased.

Finally, all of the studies performed show that the size of hole required is such that a hole 18 does not decrease the mechanical qualities of the heel 16 of the blade 8.

Figure 8:
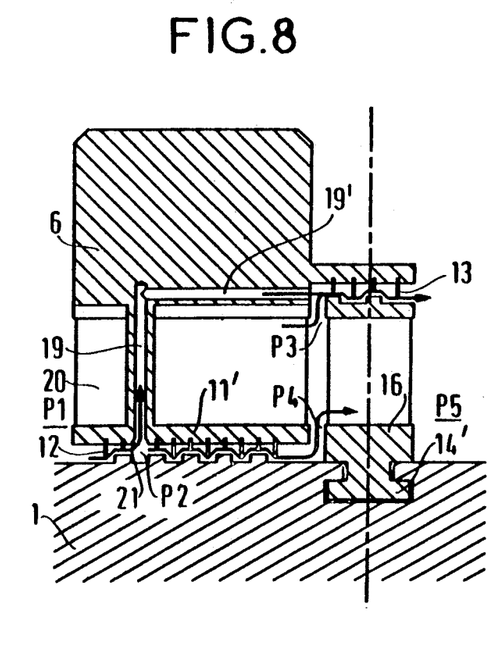
FIG. 8 is a section through one stage of an impulse turbine of the invention provided with a third improvement.
Figure 9:
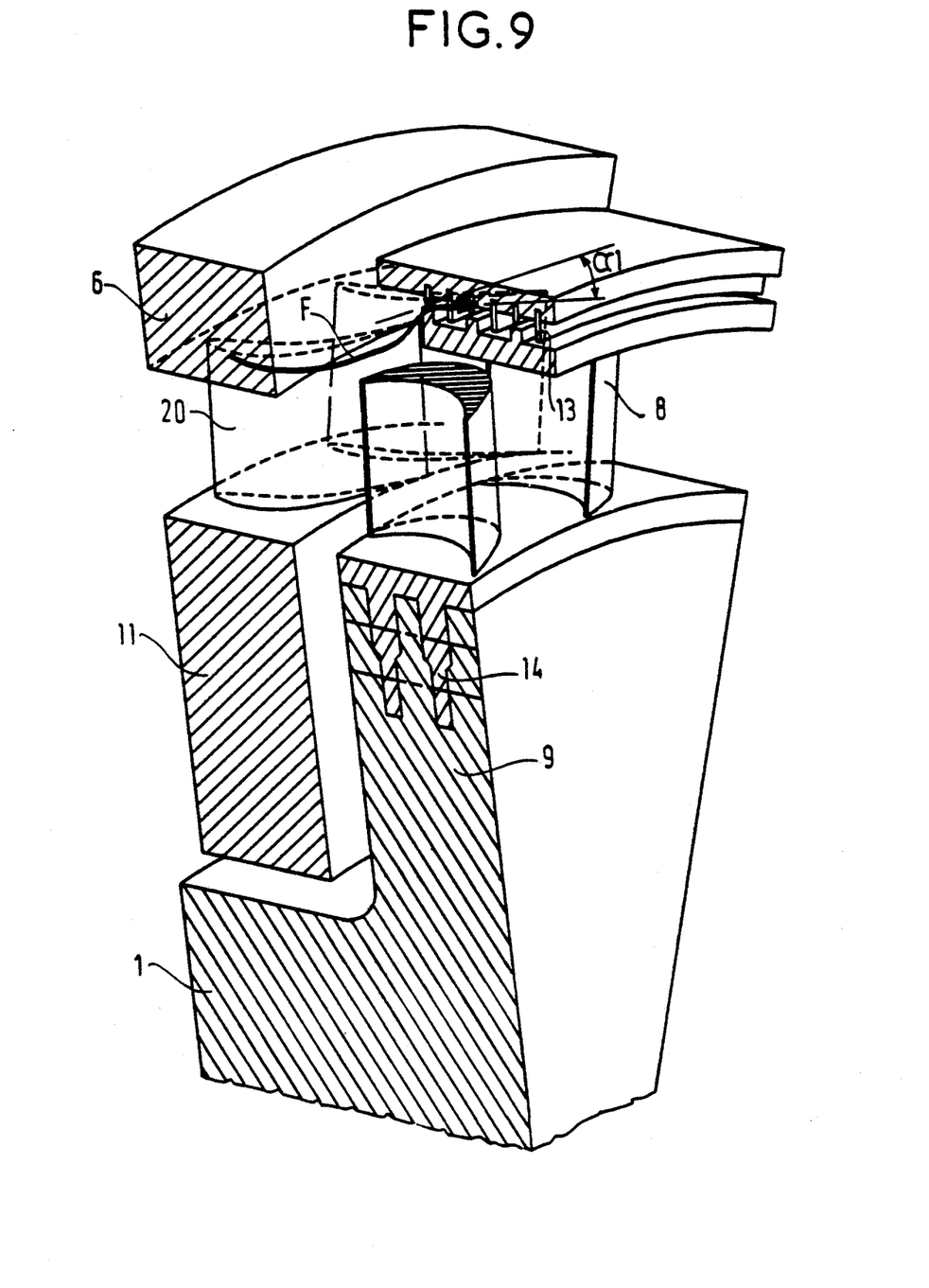
FIG. 9 is a perspective view of one stage of an impulse turbine on a rotor with disk showing the leakage at the tips of the moving blades coming from the outlet of the stationary blading (vector inclined at an angle a1).
Figure 10:
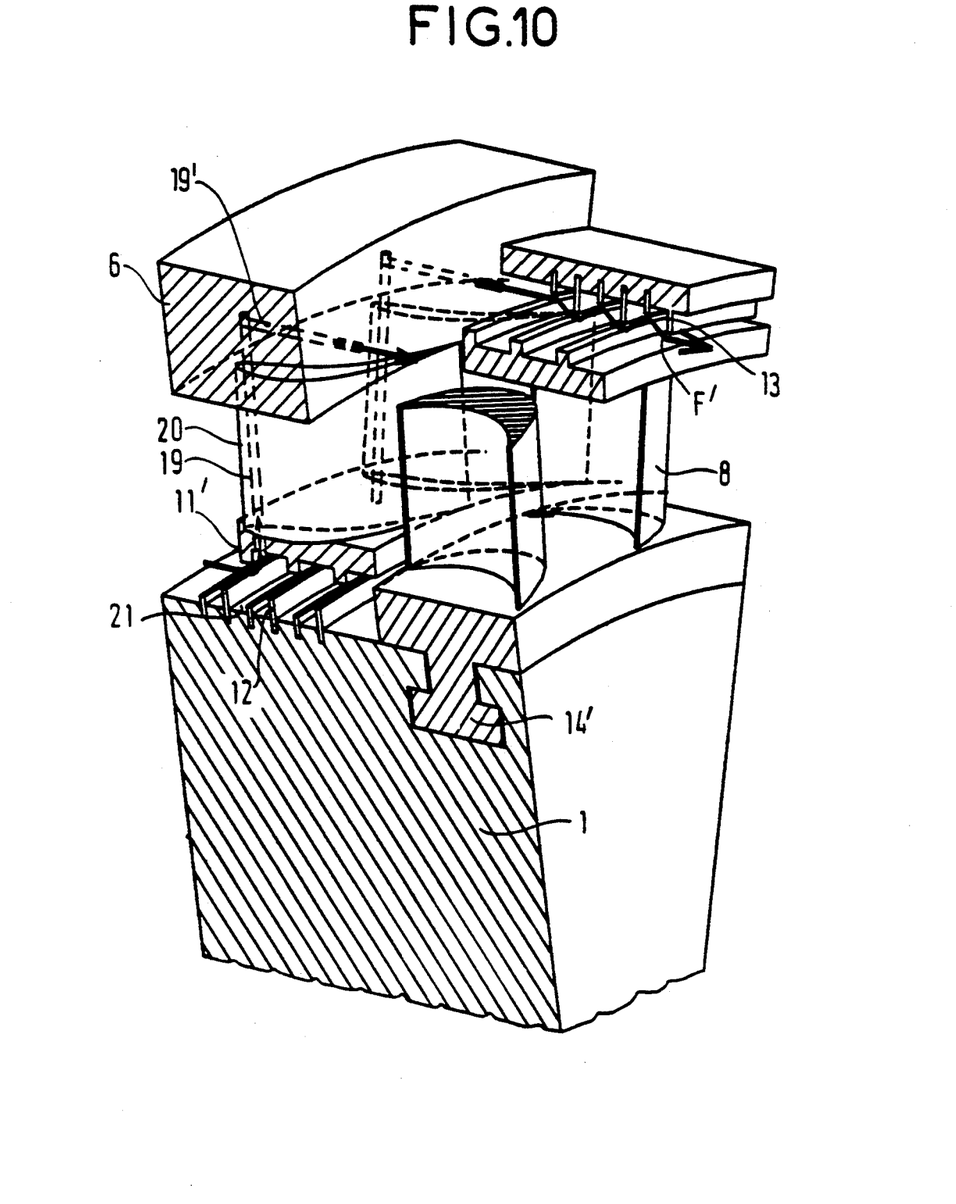
FIG. 10 is a perspective view of the stage shown in FIG. 7 for a drum rotor showing the leakage at the tips of the moving blades coming from leakage at the base of the diaphragm via axial holes.

In another improvement of the invention as shown in FIGS. 8 to 10, a hole 19 is drilled radially through each stationary blade 20 and is extended by a hole 19′ extending axially through the peripheral ring. Leakage steam can thus be taken from the first chamber 21 in the gland 12 of the diaphragm 6 and injected axially to the inlet of the gland 13 for the moving blades 8, taking advantage of the pressure staging that exists within a stage: P1 > P2 > P3 > P4 > P5.

Under such conditions, a portion of the leakage at the base of the diaphragm 6 is injected to the tips of the moving blades 8, thereby making it possible to reduce overall the flow rate that is subtracted from the main flow rate of fluid working in the moving blading 7, thereby increasing efficiency.

In addition, this system provides an advantage that may be decisive in some machines. Because of the increase in power obtained using a single rotor, present machines may present instabilities before reaching full load. These instabilities are due to transverse forces that act at the periphery of the blades and that are caused by leaks of fluid between the stationary and moving portions (see FIG. 9).

It has been shown on test machines and on real machines (centrifugal compressors and turbines) that these forces are destabilizing when the fluid which penetrates into the glands possesses a large rotary component (F), and that these forces are stabilizing when the fluid penetrates axially into the glands (F').

Because of this improvement, the flow of steam at the inlet of the gland 13 no longer takes place at an outlet angle a1 relative to the stationary blades, but takes place axially.

The major portion of the fluid flow that penetrates into the sealing glands 13 of the moving blades therefore has no rotary component, and as a result of this improvement, the previously destabilizing flow becomes stabilizing.

Although its bending moment is greater than that of disk rotors, this drum rotor improvement also makes it possible to obtain a significant increase in the stability margin of HP modules, particularly with supercritical machines.

Figure 11:
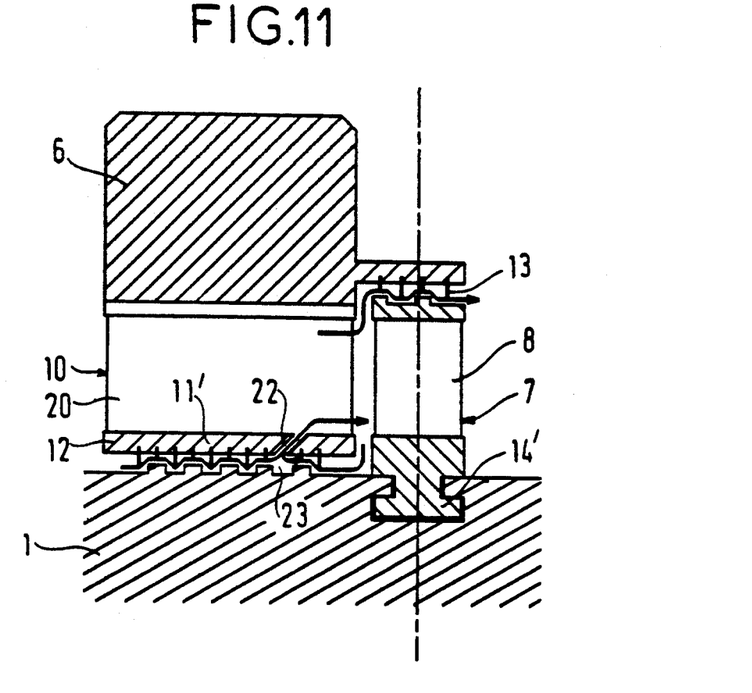
FIG. 11 is a section through one stage of an impulse turbine of the invention provided with a fourth improvement.
Figure 12:
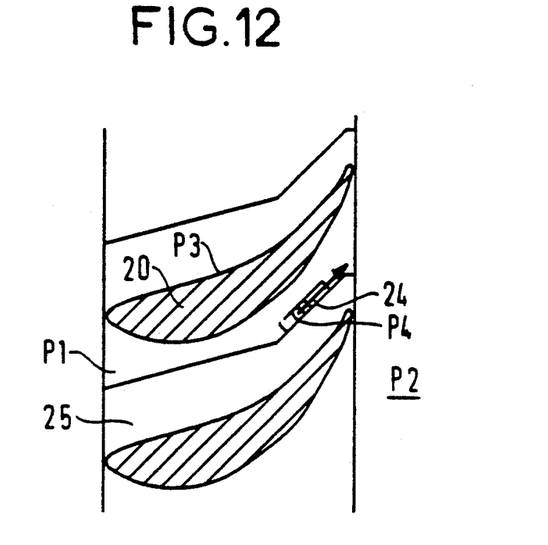
FIG. 12 is a cylindrical section through FIG. 10.

In another improvement of the invention as shown in FIGS. 11 and 12, a sloping duct 22 is drilled between one of the last chambers 23 of the sealing gland 12 of the diaphragm 6 and the throat 24 of each group of successive stationary blades 20. Because of the pressure difference, all of the leakage past the stationary blading is reinjected into the steam channel 25.

This also makes it possible to establish a small amount of suction of the flow 24 upstream from the moving blading in the gap between the stationary blading 10 and the moving blading 7.

Under such conditions, the leakage at the base of the diaphragm 6 does not disturb the main flow and imlproves the quality of the flow in the channel through the stationary blading 10 (by blowing the boundary layer).

This system makes use of the pressure staging along the channel 25 as shown in FIG. 12:

P1 > P2 > P3 > P4.

The improvements shown in FIGS. 5, 6, 8, 10, and 11 can be used separately. It is also possible to use them simultaneously, and in particular in the following groupings:
  improvements of FIGS. 5 and 8;
  improvements of FIGS. 6 and 8; or
  improvements of FIGS. 8 and 11.

Figure 13:
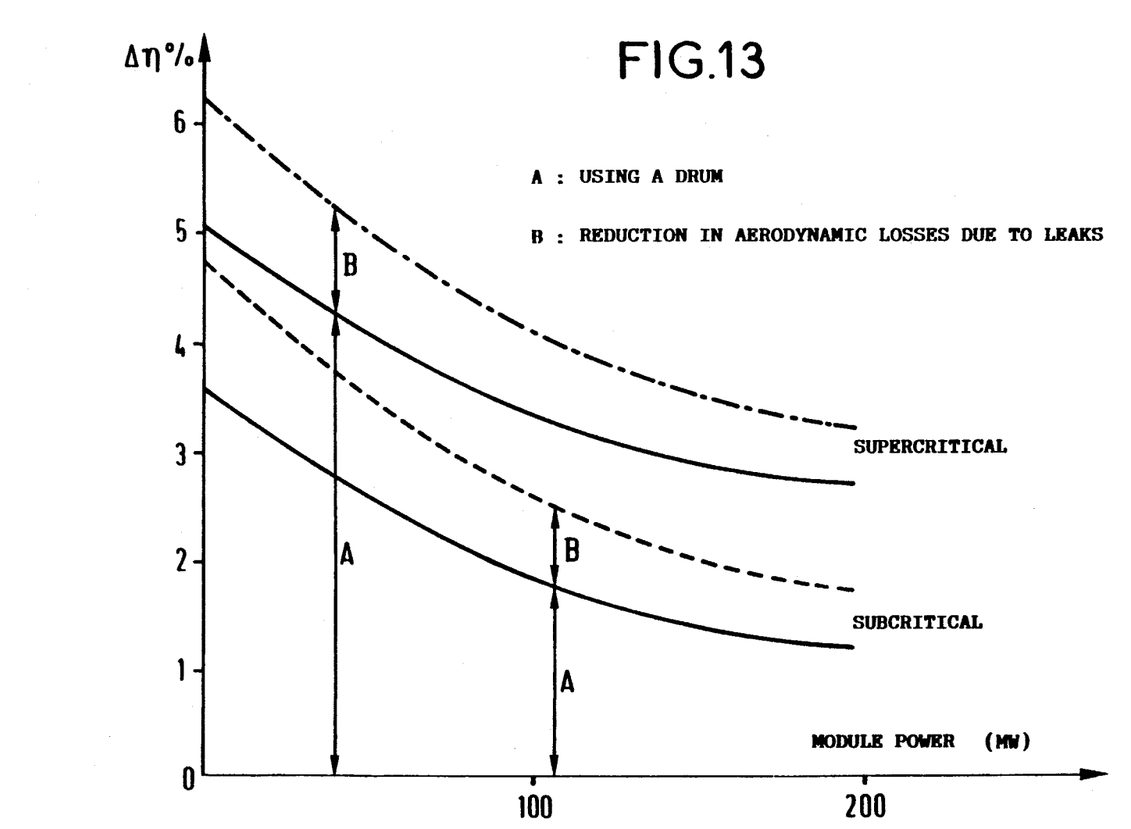
FIG. 13 shows the gains in efficiency obtained by the invention.

In the HP modules of subcritical (180 bars) and supercritical (> 200 bars) impulse turbines, the invention makes it possible:
  to improve the aerodynamic efficiency of the HP streamlines under consideration by an amount (A) of 1% to 4% (depending on the power of the machine and the chosen thermodynamic cycle), merely by using a drum rotor (see FIG. 13);

the drum rotor facilitates installing devices capable of reducing the aerodynamic losses due to the leakage of steam at diameter DR' of the diaphragm 8 and reinjected upstream from the moving blading as explained above (drilling through the nozzle blades; drilling through the lower hoop; balancing holes; chamfering the lower hoop). The aerodynamic losses due to reinjecting the leakage are very high in impulse turbines because of the large pressure drop across the stationary blading. They may be in the range 1% to 2% of the deficiency of the module. The techniques described enable these losses to be reduced by a quantity (B) that may be as much as 70% (see FIG. 12);

the drum rotor facilitates installing a device (drilling the blades of the diaphragms) enabling rotor instabilities due to steam forces to be reduced (see FIGS. 9 and 10);

the transverse dimensions and the mass of a module can be reduced; and it becomes easier to ensure that the stator portions withstand pressure.

All of this is achieved while retaining the longitudinal dimensions of the module.

Finally, the fact of retaining the impulse turbine principle while using a drum rotor has the following advantage:

for given rotor length, the base diameter is smaller for the impulse machine than for the reaction machine (both machines using a drum rotor). In addition to the efficiency gains obtained in the steam channel itself as explained above, the very low thrust on the rotor of an impulse turbine means that the diameter of its balancing piston is much smaller than that of a reaction turbine. This point also gives rise to a further gain in efficiency that may be as much as 2% for certain very high pressure machines.

We claim:

1. In an impulse steam turbine comprising a rotor and a stator having a plurality of stages each constituted by a diaphragm with stationary blading followed by moving blading comprising moving blades that rotate with the rotor, the improvement wherein said rotor is devoid of disks, said moving blades are mounted directly on the rotor, wherein said stationary blading provides more that 85% of the pressure drop at the base of each stage and having an inner hoop at the base of each stage around the rotor, and said impulse steam turbine further including means for effecting leakage at the base of the diaphragm and means for injecting said leakage substantially axially into the main flow of steam, and wherein said means for injecting said leakage are constituted by an oblique gap between chamfered roots of said moving blades and chamfered facing ends of said inner hoop of the diaphragm.

2. In an impulse steam turbine comprising a rotor and a stator having a plurality of stages, each constituted by a diaphragm with stationary blading followed by moving blading comprising moving blades rotating with the rotor, the improvement wherein the rotor is devoid of disks, said moving blades have roots mounted directly on the rotor, wherein said stationary blading provides more than 85% of the pressure drop at the base of each stage and have an inner hoop at the base of each stage around the rotor, and said impulse steam turbine further including means for effecting leakage at the base of the diaphragm, wherein said blades of said rotor have heels and wherein the heel of each blade fixed to the rotor is pierced by a hole extending substantially parallel to the axis of the rotor for putting the two sides of the heel into communication with each other, with the inlet of the hole being situated in the vicinity of the base of the diaphragm, thereby enabling the entire flow rate of the leakage beneath the diaphragm to pass therethrough together with a small fraction of the main flow.

3. An impulse steam turbine comprising a rotor and a stator having a plurality of stages, each stage constituted by a diaphragm with stationary blading followed by moving blading comprising moving blades rotating with the rotor, the improvement wherein said rotor is devoid of disks, said moving blades have roots mounted directly on the rotor, and wherein said stationary blading provides more than 85% of the pressure drop at the base of each stage and having an inner hoop at the base of each stage, around the rotor, wherein the base of the diaphragm includes a first sealing gland comprising a plurality chambers in series, the tips of the moving blades include a second sealing gland, and wherein the stationary blades and the diaphragm of the steam turbine are provided with holes which open to and suck leakage steam from a first chamber of the first sealing gland in the leakage flow direction through said first sealing gland, at the base of the diaphragm and inject said steam axially into an inlet of the second sealing gland for the moving blades.

4. In an impulse steam turbine comprising a rotor and a stator having a plurality of stages each constituted by a diaphragm with stationary blading followed by moving blading comprising moving blades rotating with the rotor, the improvement wherein said rotor is devoid of disks, said moving blades have roots mounted directly on the rotor, and wherein said stationary blading provides more than 85% of the pressure drop at the base of each stage, and wherein a spacer band of a diaphragm mounts the roots of the stationary blades, a first sealing gland is constituted by a plurality of chambers in series, wherein a spacer band includes sloping channels connecting one of last chambers of the first sealing gland with the steam main flow and wherein the leakage between the diaphragm and the rotor is reinserted tangentially into a steam channel formed between two successive blades of the stationary blading.

* * * * *